United States Patent [19]
Freidmann et al.

[11] 3,881,000
[45] Apr. 29, 1975

[54] BIS-(PHOSPHORYLATED ANTHRALIN) COMPOUNDS IN THE TREATMENT OF PSORIASIS AND ARTHRITIS

[75] Inventors: Charles Aubrey Freidmann, Florence, Italy; Peter Hofer, Liestal, Switzerland; Winthrop E. Lange, Greenwich, Conn.

[73] Assignee: Mundipharma AG, Rheinfelden, Switzerland

[22] Filed: May 30, 1973

[21] Appl. No.: 365,309

Related U.S. Application Data
[62] Division of Ser. No. 178,829, Sept. 8, 1971, Pat. No. 3,792,129.

[52] U.S. Cl. ............................................. 424/209
[51] Int. Cl. ........................................... A61k 27/00
[58] Field of Search .................................. 424/209

[56]  References Cited
  UNITED STATES PATENTS
3,008,951   11/1961   Ferno et al. .................... 260/974 X Primary Examiner—Stanley J. Friedman
Attorney, Agent, or Firm—Wolder & Gross

[57] ABSTRACT

Phosphorylated bis-anthracenetriol compounds of the structure

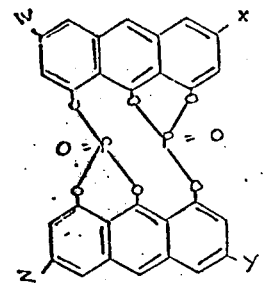

wherein W, X, Y and Z are selected from the group consisting of hydrogen, lower alkyl, halo-alkyl, acetoxi-alkyl, carboxyl, carboalkyloxi, alkyloxialkyl, halogen and nitro wherein said alkyl is from 1 to 3 carbon atoms in chain length, are prepared by phosphorylating appropriate 1,8,9-trihydroxi-anthracene or 3-substituted-1,8,9-trihydroxi-anthracene compounds in the presence of an aromatic or aliphatic tertiary amine base, preferably pyridine. The resultant compounds are useful in the treatment of psoriasis, seborrhea, eczema, inflammation and arthritis. Pharmaceutical compositions such as ointments, lotions, shampoos and detergent cakes, beside oral and rectal application forms, containing the aforesaid compounds are described together with methods for their preparations and their use in therapy.

9 Claims, No Drawings

BIS-(PHOSPHORYLATED ANTHRALIN) COMPOUNDS IN THE TREATMENT OF PSORIASIS AND ARTHRITIS

This is a division of application Ser. No. 178,829, filed Sept. 8, 1971, now U.S. Pat. No. 3,792,129.

The present invention relates to certain phosphorylated bis-anthracene triol compounds and pharmaceutical compositions containing the same, the methods for their preparation and the methods for their use in treating dermatologic disease, inflammation and arthritis. In particular it relates to compounds having the formula:

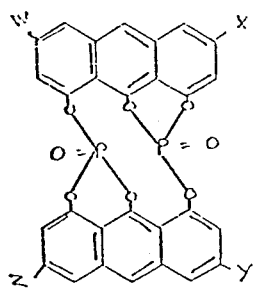

wherein W, X, Y and Z are selected from the group consisting of hydrogen, lower alkyl, halo-alkyl, acetoxialkyl, carboxyl, carbo-alkyloxi, alkoxi, halogen, nitro and alkyloxialkyl, wherein said alkyl groups are from 1 to 3 carbons in chain length, and pharmaceutical compositions such as ointments, lotions, shampoos and detergent cakes, beside oral and rectal application forms, containing the same; the methods for the preparation of said compounds and said pharmaceutical compositions, and the method for treating seborrhea, psoriasis and eczema, inflammation and arthritis.

Psoriasis is a chronic, and occasionally an acute, relapsing, papulosquamous skin disease of unknown etiology, that is generally not responsive to the presently available therapeutic agents. While early lesions are more amenable to treatment than long-standing ones, so that the acute attack will usually abate within a reasonably short period of time, recurrence is almost always certain. It is well recognized that prolonged use of the conventional therapeutic agents utilized to treat psoriasis will reduce the effectiveness of the agent resulting in an excerbation of the disease in a more serious and resistant form.

The connection between psoriasis and reticuloendothelial disorders has recently been shown in the literature wherein simple anthrolone compounds have been found to cause a temporary remission of the psoriatic lesion and at the same time to alleviate symptoms of arthritis. That anthracene compounds exert a beneficial dermatologic action has been known for many years and 1,8-dihydroxy-9-anthrone has been used in the therapy of skin disease for a long time. However all anthrone compounds hitherto utilized in topical therapy possess the common inherent limitation in that these are rapidly oxidized to the quinone form which destroys their therapeutic potential. Furthermore, the oxidized anthrone compound acts as a toxic tissue irritant and does not penetrate the skin barrier to affect the cellular physiology wherein the abnormality resides. To further complicate the therapeutic use of the presently available anthracenic compounds is the knowledge that ultra-violet light increases their oxidative potential and yet, ultra-violet light remains an important part of the therapeutic regimen in the treatment of psoriasis (see the Goehermann Treatment Regimen for example).

In the development of the understanding of psoriasis by the use of the electron microscopic cytoplasmic differentiation techniques, the role of enzymes in the overall oxidation potential of the psoriatic cell was demonstrated. Primary tissue cultures obtained from untreated and treated psoriatic patients demonstrated that there was a differentiation in the ultra-structure of the cells of the psoriatic lesion which is altered in the direction of the normal tissue cell when these were treated with an enzyme inhibitor substance and/or anti-inflammatory agents. Thus it was shown that cellular enzymes involved in glycolysis were increased in the psoriatic lesion while the enzymes involved in fat metabolism decreased. Furthermore, with the electron microscope it was demonstrated that acid-phosphorylase activity shifted from the intracellular level in the normal epidermis, to the extra-cellular level in the ortho and para-keratotic epidermal tissue.

Seborrheic dermatitis is a chronic erythematous, scaling inflammation of the skin often occuring in conjunction with psoriasis and eczema. The predominant symptom is a dysfunction of the sebaceous gland often accompanied by a predisposition to acute and chronic skin infections. Eczema has become synonymous with chronic dermatitis and is characterized by an acute or chronic superficial scaling. While the exact etiology for both seborrhea and eczema is unknown, it has been suggested to be a cellular enzyme disturbance resulting in an abnormal tissue metabolism. Efforts to establish a relationship between cellular nutrients and the diseased state have been generally failed and treatment has been virtually entirely limited to symptomatic approaches. Thus, keratolytic agents, scaling agents, counter-irritants, drying agents and a host of other symptom-specific dermato-pharmacologic agents have been employed over the years, with varying degrees of success. While patterns have been developed in treating certain of these diseases, as for example, the use of sulphur and keratolytic agents in the treatment of seborrhea, a common therapeutic approach to these diseases, remains to be developed. It is suggested that psoriasis, seborrhea, eczema and the related dermatitis possess the common denominator of abnormal cellular respiratory oxidative enzyme activity and that enzyme inhibitory agents hold promise in ultimately resolving these pathologic problems.

It was unexpectedly found that certain bis-(phosphorylated anthracene triol) compounds were capable of beneficially affecting the psoriatic lesion, seborrheal conditions and eczema, inflammation and arthritis. Moreover, the aforesaid bis-(phosphorylated anthracene triol) derivatives were capable of penetrating through the keratin tissue barrier and were not affected by oxidation and exposure to light.

The class of bis-(phosphorylated anthracene triol) derivatives represents a hitherto unknown class of chemical compounds in that phosphorylation results in the formation of a bis-molecular structure that is sterically hindered to reduce the potential for degradative chemical changes and yet, capable of affecting chemical reactions on the cellular level. Furthermore, similar pharmacologic activity is obtained by appropriate substitution in the three and/or six positions. By the introduction of a carboxyl group into the molecule water soluble and insoluble metal salts may be formed.

The new bis-(phosphorylated anthracene triol) compounds have the following generic structural formula:

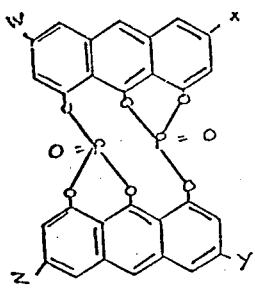

and (1,1',8,8',9,9')-dianthracenetriyl (1,9,8'), (1',9',8)-diphosphate may be considered to be the parent compound for the new class. Through the use of appropriate starting materials, substituted in the three or six position, the corresponding (3,3') (6,6') (3,6') or (3,3',6,6') substituted phosphorylated dianthracene triol compounds are obtained. Preferred compounds of this series are:

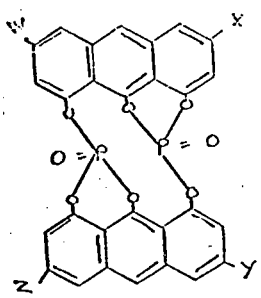

wherein W, X, Y and Z represents a group selected from the groups consisting of hydrogen, lower alkyl (preferably methyl), haloalkyl (preferably chloromethyl), acetoxialkyl (preferably acetoximethyl), carboalkyloxi, alkyloxi (preferably methoxi), carboxyl, halogen alkyloxialkyl and nitro wherein the alkyl group is from 1 to 3 carbon atoms in chain length.

Dianthracenetriyl (1,1',8,8',9,9')-diphosphate is prepared through the phosphorylation of 1,8,9, trihydroxianthracene. Phosphorus oxychloride is a preferred phosphorylating agent and the synthesis is conducted in pyridine or a suitable tertiary amine as a catalyst solvent. The reaction is exothermic and rapidly proceeds to completion at temperatures above 50°C. 3-monosubstituted bis-(phosphorylated-anthracene triol) compounds occur as a mixture of three isomers, (3,3'), (6,6'), (3,6') substituted compounds. When chrysophanol-9-anthrone is reacted with phosphorus oxychloride, the dimethyl-dianthracenetriyl(1,1',8,8',9,9')-diphosphate is obtained as a mixture of the (3,3'), (6,6'), and (3,6')-dimethyl, isomers. In a similar manner, when 1,9,8-trihydroxi anthracene 3-acetoximethyl, 1,9,8-trihydroxy-anthracene-3-alkyloxi 3-alkoxialkyl-1,9,8-trihydroxy-anthracene, wherein said alkyl group is from 1 to 3 carbon atoms in chain length and 3-chloromethyl-1,8,9 trihydroxyanthracene are phosphorylated, then the corresponding substituted bis-(phosphorylated anthracenetriyl) derivative is obtained.

Dicarboxy-dianthracenetriyl (1,1',8,8',9,9')-diphosphate is obtained as a mixture of (3,3'), (6,6') and β,6') substituted compounds, and is capable of forming an alkali metal salt, soluble in water as well as water insoluble metalic salts through the salt-forming properties of the carboxyl group. Di-(chloromethyl)-dianthracenetriyl (1,1',8,8',9,9')-diphosphate is obtained through the phosphorylation of 3-chloromethyl-1,8,9,trihydroxyanthracene.

The bis-(carbethoxi-anthracenetriyl)-(1,1'8,8',9,9')-diphosphate is obtained through the phosphorylation of 3-carbethoxi-1,8,9 trihydroxyanthrene and bis-(acetoximethyl)-anthracenetriyl)-(1,1',8,8',9,9')-diphosphate is obtained through the phosphorylation of 3-acetyoximethyl 1,8-dihydroxy-9-anthrone.

The corresponding bis-(alkyloxialkyl)-anthracenetriyl (1,1'8,8',9,9')-diphosphate, wherein said alkyl group is from 1 to 3 carbon atoms in chain length, is prepared by the phosphorylation of the appropriate: 3-methoximethyl-1,8,9-trihydroxy-anthracene, 3-ethoxialkyl-1,8,9-trihydroxy-anthracene 3-ethoxi-methyl-1,9,8-trihydroxy-anthracene, 3-propoxipropyl-1,9,8-trihydroxy-anthracene, 3-isopropoximethyl-1,9,8-trihydroxy-anthracene, 3-propoximethyl-1,9,8-trihydroxy-anthracene, in a solvent selected from the group of pyridine and tertiary amines.

The bis-anthracenetriol phosphorylated compounds are obtained as crystalline substances, yellow to brown in color, melting above 300°C, insoluble in water, and little soluble in alcohol, propylene glycol, acetone and chloroform. The compounds are stable and without odor. Elementary analysis reveals a good agreement with the theoretical values to establish the structure and composition of the new compounds.

The new compounds have a characteristic infra-red spectrum. Some isomeric forms of the substituted dianthracene triol phosphorylated compounds may be separated by thin layer chromatography.

The phosphorylation reaction is preferably conducted with phosphorus oxychloride or trichloride for the synthesis of the corresponding phosphites and a hydrogen chloride entrapment catalyst solvent, as for example, pyridine, or a suitable liquid tertiary amine. The ratio of phosphorus oxychloride to the appropriate anthrone is 1 molar equivalent of phosphorus oxychloride for each mol of anthralin compound although a slight excess of from 2 to 5 percent of phosphorus oxychloride is preferred. Under certain conditions it may be found desirable to increase the ratio of phosphorus oxychloride to anthralin compound four-fold. The reaction is exothermic and proceeds to completion without the aid of heat. Although the compounds are heat stable, the preferred temperature range for the reaction is between 50°C and 80°C, maintained for a period of from one to four hours.

At the conclusion of the synthetic reaction, the mixture is allowed to cool to room temperature, whereupon the solid separated material is filtered, washed with pyridine and cold water and dried. An alternate procedure is to pour the mixture onto the cracked ice and then filtering the insoluble material which is washed with pyridine to remove any unreacted reagent and dried. Recrystallization may be accomplished by dissolving the compound in acetone, adding water to the point of clouding and then setting aside to crystallize in the cold. Still another alternate crystallizing procedure is to dissolve the dried new compound in boiling alcohol and crystallizing in the cold.

When used therapeutically, the powdered active compound described above may be applied directly to the lesion or skin area after being treated. Such use provides the maximum tissue stimulant effect and is only indicated in certain acute states. In the usual course of therapy, the active compound is incorporated into a pharmaceutically acceptable vehicle to form an ointment, lotion, shampoo, or cleansing cake composition which is applied to the affected area from one to six times daily or tablets for oral application.

Ointments are prepared by combining the selected active ingredient with a pharmaceutically acceptable ointment base so that the range in concentration of the selected new compound is between 0.1 percent to 15 percent by weight. The ointment base may be either a hydrophilic or lipophilic emulsion base or a prepared ointment preparation such as cold cream, hydrophylic petrolatum U.S.P., or hydrophylic ointment base, U.S.P. or an oleaginous or water-soluble carrier such as petrolatum or polyethylene glycol. The method of incorporating the active ingredient in the selected active ointment base may be by levigation in the cold or dispersion in the hot molten base.

A lotion containing the new phosphorylated anthralin compounds may be prepared by dispersing the selected active ingredient in an aqueous or hydroalcoholic vehicle. Suitable suspending agents and/or a thickening agent may be added as well as perfume and coloring substances. Such suspending agents as hydrated methyl cellulose and carboxy methyl cellulose may be used advantageously. Surface-active agents such as sodium lauryl sulfate will facilitate the dispersion of the active ingredient throughout the lotion vehicle, as well as to confer a beneficial penetrating capacity to the lotion.

The lotion vehicle may be either water, alcohol or mixtures of the same. Medicated or aromatic pharmaceutical waters may also be used in the preparation of a lotion and glycerin and propylene glycol may be added to provide special dermatologic properties, if desired. It will be found beneficial to utilize an alcoholic or an hydroalcoholic lotion in certain instances in which case, the concentration of alcohol may be as high as 70 percent and as low as 10 percent. The concentration of the selected active ingredient in the lotion will range from 0.1 to 15 percent, by weight.

It will be found useful to prepare cleansing compositions containing the new compounds and such preparations may be in either liquid or solid dosage forms. Liquid cleansing preparations are preferably used to treat the hair, scalp and other body areas wherein selective control of the medication is desired. Such liquid preparations containing the active phosphorylated compounds may be prepared as shampoos or liquid soaps and contain from 0.1 to 25 percent by weight of the selected new phosphorylated anthracene triol derivatives described herein. The aforesaid liquid cleansing preparations may be prepared in an aqueous vehicle containing from 5 to 40 percent by weight of a non-ionic or anionic surface-active compound, and from 0.1 to 25 percent by weight of the selected active compound. Up to 25 percent of glycerin, propylene glycol or polyethylene glycol having a molecular weight of from 200 to 800 may be added if desired. Suitable perfumes and coloring agents may also be added.

The solvent for the preparation of the liquid cleansing preparations is usually water, although small amounts of alcohol may also be added. Oil-base liquid preparations may also be used, in which case the solvent may be a bland vegetable oil, as for example, cotton-seed oil, poppy-seed oil, olive oil, peanut oil, sesame-seed oil or mixtures of these. From 5 to 10 percent of a fatty alcohol may also be added, if desired. The cleansing compound may be a non-ionic or anionic surface-active preparation and is used in concentrations of from 5 to 35 percent by weight.

It may be found useful to prepare a liquid cleansing concentrate, in which case the active phosphorylated compound is mixed directly with the detergent carrier. The concentration of detergent in such preparations may be as high as 85 percent by weight and the solvent for such preparations may be either water or oil. It is especially important that the pH of such liquid cleansing solutions be no greater than pH 6.

When a solid cleansing bar is preferred, then from 0.1 percent to 25 percent by weight of the selected new phosphorylated compound is mixed with a pharmaceutically acceptable diluent as for example, a polyethylene glycol compound having a molecular weight of from 1,000 to 6,000, a higher fatty alcohol or fatty acid and mixtures of the same, and to this is added from 5 to 35 percent by weight of a pharmaceutically compatible surface-active compound as for example, a non-ionic, or anionic detergent compound. Of critical importance is the avoidance of detergents that are alkaline in reaction or are active in the alkaline range, since a pH above pH 6 will tend to decompose the new compound to form a red color. It is for this reason that the alkaline soaps are to be avoided. In preparing the bar either an extrusion, stamping or hot-pour method of manufacture may be used.

The liquid cleansing preparation and the solid detergent bar containing the active ingredient are used for cleansing as well as treating the affected area. The method for the use of these preparations is to wet the affected area and apply the shampoo or solid detergent bar to the site and to develop a copious lather. The lather is permitted to remain in situ for at least five minutes and then rinsed. The process may be repeated if desired. While the detergent bar may be used as often as desired, the shampooing of a hairy area will vary from once a week to four times weekly depending upon the specific patient's need.

EXAMPLE 1

To a 3 neck flask, fitted with a stirrer and inlet tube and a nitrogen gas inlet and outlet flow tube is placed a suspension of 80 gms. of 1,8 dihydroxy-9-anthrone in 200 ml. of pyridine. The supernatent oxygen is removed by flushing with nitrogen and a steady stream of gaseous nitrogen is continued to maintain an oxygen-free atmosphere. The mixture is stirred and a solution of 33.1 ml. of phosphorus oxychloride ($POCl_3$) dissolved in 200 ml. of pyridine is added in small increments. When all of the phosphorus oxychloride has been added the mixture is warmed to about 80°C for approximately 2 hours and then cooled to room temperature. The mixture is filtered and the separated crystalline material washed with cold pyridine and water until there is no further chloride ion present in the wash-water. The crystals on the filter are dried and are dianthracenetriyl (1,1',8,8',9,9')-diphosphate.

The new compound, dianthracenetriyl(1,1',8,8',9,9')-diphosphate has a molecular weight of 540 determined by mass spectrometry and an emperical formula of $C_{28}H_{14}O_8P_2$. It analyzes in good agreement with the theoretical values for carbon and hydrogen (% carbon, calculated 62.23%, found 61.93%; % hydrogen, calculated, 2.61%, found, 2.99%). The following structural formula may be postulated for dianthracenetriyl (1,1',8,8',9,9')-diphosphate:

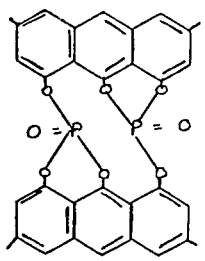

The new compound is a yellow crystal, without odor, melting above 300°C. It is insoluble in water, slightly soluble in ethanol and propylene glycol, acetone and chloroform. When treated with dilute alkali, it goes into solution, with decomposition, forming a red color.

EXAMPLE 2

In a suitable flask containing 50 ml. of pyridine is added 12.5 gm. of chrysophanol-9-anthrone and a solution of 4.9 ml. of phosphorus oxychloride ($POCl_3$) dissolved in 20 ml. of pyridine is added, in small increments, with stirring. The supernatent air is replaced with gaseous nitrogen and the mixture is warmed to 80°C for a period of about 2 hours, while stirring, after which time it is allowed to cool to room temperature. Yellow to brown crystals separate and are filtered, washed with pyridine and water and air-dried.

The formed compounds are the isomeric bis-(methylanthracenetriyl)-(1,1',8,8',9,9')-diphosphates, having an emperical formula of $C_{30}H_{18}O_8P_2$ and a molecular weight of 568. The compound has the following analysis: % carbon calculated: 63.39; found, 63.4; 63% hydrogen calculated: 3.19; found 3.96, 3.46.

The new compound melts above 300°C and is insoluble in water, soluble in ethanol and propylene glycol and extremely soluble in acetone and chloroform. It is slowly decomposed by dilute alkali, gradually turning red in color.

Bis-(methylanthracenetriyl) (1,1',8,8',9,9')-diphosphate is a mixture of the (3,3'), (6,6'), and (3,6') dimethyl isomers, which may be partially separated by repeated chromatography. The new compounds have the following postulated structural formula:

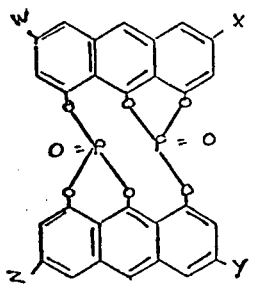

The 3,3' compound, wherein X and Z are methyl groups and W and X are hydrogen atoms. The 6,6' compound, wherein W and Y are methyl groups and X and Z are hydrogen atoms. The 3,6' compound, wherein X and Y are methyl groups and W and Z are hydrogen atoms.

EXAMPLE 3

In a suitable container fitted with a stirrer and a gas inlet tube is placed a solution of 28.5 gm. of 1,8-dihydroxy-9-anthrone-3-carboxylic acid dissolved in 100 ml. of pyridine. Gaseous nitrogen is bubbled through the solution and 33.5 gm. of phosphorus oxychloride ($POCl_3$), dissolved in 200 ml. of pyridine is added in small increments while stirring. The mixture is warmed to about 80°C for approximately two hours and then cooled to room temperature, treated with water, filtered and the crystalline material washed with cold pyridine and water. The solid, crystalline infiltrate is dried and is dicarboxi-dianthracenetriyl (1,1',8,8',9,9')-diphosphate. The new compound, is odorless and has a molecular weight of 638 with an emperical formula of $C_{30}H_{14}O_{12}P_2$. The new compound exists in three isomeric forms and is postulated to have the following structure:

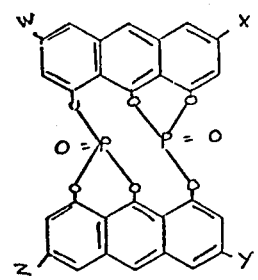

The 3,3' compound, wherein X and Z are carboxyl groups and W and Y are hydrogen atoms.
The 6,6' compound, wherein W and Y are carboxyl groups and X and Z are hydrogen atoms.
The 3,6' compound, wherein X and Y are carboxyl groups and W and Z are hydrogen atoms.

The new compound is yellow to brown in color, with a melting point above 300°C. The formed new compound is insoluble in water, slightly soluble in ethanol and propylene glycol, acetone and chloroform.

The new compound forms a metallic salt when treated with solutions or suspensions of metallic oxides, metallic hydroxides, metallic carbonates, and metallic bicarbonates, and also forms the respective salt when reacted with divalent and trivalent metallic halogen, sulfate, nitrate compounds.

EXAMPLE 4

In a suitable container fitted with a stirrer and a gas inlet tube is placed 29 gm. of 3-acetoximethyl-1,8-dihydroxy-9-anthrone and 100 ml. of pyridine. Gaseous nitrogen is bubbled through the mixture and 15.2 gm. of phosphorus oxychloride ($POCl_3$) dissolved in 100 ml. pyridine, is added in small increments with stirring. When all of the phosphorus oxychloride has been added, the mixture is warmed to 80°C for a period of at least one hour, after which time it is cooled to room temperature. The mixture is set aside to crystallize and the crystals are filtered, washed with pyridine and water and dried. The dried compound is the bis-β- acetoximethyl-anthracenetriyl) (1,1',8,8',9,9')-diphosphate. The compound may be recrystallized from acetone.

The formed new compound is a yellow crystalline substance with a melting point above 300°C and a molecular weight of 684 and an emperical formula of $C_{34}H_{22}O_{12}P_2$. The new compound is obtained as a mixture of three isomeric forms and the following structural formula may be postulated:

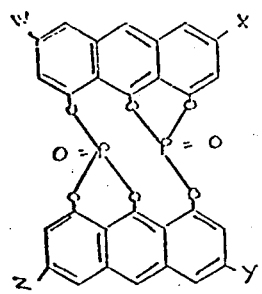

The 3,3': wherein X and Z are a acetoximethyl group and W and Y are hydrogen atoms.
The 6,6': wherein W and Y are a acetoximethyl group and X and Z are hydrogen atoms.
The 3,6': wherein X and Y are a acetoximethyl group and W and Z are hydrogen atoms.

The new compound is insoluble in water, slightly soluble in ethanol and propylene glycol. When treated with alkali, it decomposes to form a red color.

EXAMPLE 5

To a solution of one-hundredth gram mol of 3-chloromethyl-1,8-dihydroxy-9-anthrone dissolved in 20 ml. of pyridine is added 0.13 gm. mol of phosphorus oxychloride ($POCl_3$) dissolved in 5 cc. of pyridine and the whole stirred overnight. The mixture is then decomposed by pouring onto cracked ice and filtered. The solid material remaining on the filter is washed with pyridine and dissolved in acetone. The acetone solution is diluted with water to the point of clouding and set aside in a refrigerator to crystallize. The crystals are filtered and air-dried. The dried crystalline compound is di(methylchloro)-dianthracenetriyl (1,1',8,8',9,9')-disphosphate.

The new compound is yellow to brown in color with a melting point above 300°C and is insoluble in water, slightly soluble in ethanol and propylene glycol and soluble in acetone and chloroform. The new compound has a molecular weight of 37 (636, 638, 640) with an emperical formula of $C_{30}H_{16}Q_2O_8P_2$. The new compound is a mixture of three isomeric forms and the following structural formula may be postulated.

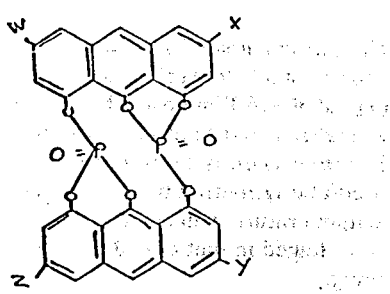

The 3,3' compound, wherein X and Z is the chloromethyl group and W and Y are hydrogen atoms.
The 6,6' compounds, wherein W and Y is the chloromethyl group and X and Z are hydrogen atoms.
The 3,6' compound, wherein X and Y is the chloromethyl group and W and Z are hydrogen atoms.

EXAMPLE 6

In place of the 3-acetoximethyl-1,8-dihydroxy-9-anthrone described in Example 4, there may be substituted in equal molecular proportions, 1,8-dihydroxy-9-anthrone-3-ethyl carboxylate. The remainder of the steps being the same and the corresponding compound formed is the bis-(anthracenetriyl carboxylate) (1,1',8,8',9,9')-diphosphate. The compound is a mixture of three isomeric compounds and has the following postulated structure:

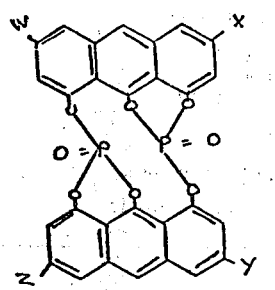

The 3,3' compound, wherein X and Z is ethyl carboxylate and W and Y are hydrogen atoms.
The 6,6' compound, wherein W and Y is ethyl carboxylate and X and Z are hydrogen atoms.
The 3,6' compound, wherein X and Y is a ethyl carboxylate and W and Z are hydrogen atoms.

EXAMPLE 7

To a suspension of 0.01 gm. mol of 3-methoximethyl-1,8-dihydroxy-9-anthrone in 10 ml. of pyridine is added 0.01 gm. mols of phosphorus oxychloride dissolved in 5 ml. of pyridine. The mixture is stirred, warmed to 60°C for a period of four hours and then cooled to room temperature. The separated solid material is filtered, washed with pyridine and water and dried. The formed compound is the bis-β-methoximethyl-anthracenetriyl) (1,1',8,8',9,9')-disphosphate and occurs as a mixture of three isomeric forms with the following postulated structural formula:

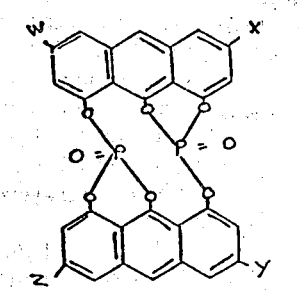

wherein the 3,3' substituted compound, the X and Z is the methoximethyl group and the W and Y are hydrogen atoms, and the 3,6' substituted compound, wherein X and Y is the methoximethyl group and the W and Z are hydrogen atoms, and the 6,6' substituted compound, wherein W and Y are methoximethyl groups and X and Z are hydrogen atoms.

In a similar manner, utilizing the following substituted anthrone compounds as reagents the corresponding bis-(alkyloxialkyl anthracenetriyl) (1,1',8,8',9,9')-diphosphate compound is obtained.

| Substituted Anthrone Reagent | Corresponding Formed Bis-(Alkyloxialkyl Anthracenetriyl) (1,1',8,8',9,9')-diphosphate |
|---|---|
| 3-(ethoxiethyl)-1,8-dihydroxy-9-anthrone | bis-(ethioxiethyl-anthracenetriyl) (1,1'8,8',9,9')-diphosphate |
| 3-(ethioximethyl)-1,8-dihydroxy-9-anthrone | bis-(ethioximethyl-anthracenetriyl) (1,1',9,9'9,9')-diphosphate |
| 3-(propoxipropyl)-1,8-dihydroxy-9-anthrone | bis-(propoxipropyl-anthracenetriyl)(1,1',8,8',9,9')-diphosphate |
| 3-(isopropoxi isopropyl)-1,8-dihydroxy-9-anthrone | bis-(isopropoxi isopropyl-anthracenetriyl)(1,1',8,8',9,9')-diphosphate |
| 3-(propoximethyl)-1,8-dihydroxy-9-anthrone | bis-(propoximethyl-anthracenetriyl)(1,1',8,8',9,9')-diphosphate |
| 3-(propoxiethyl)-1,8-dihydroxy-9-anthrone | bis-(propoxiethyl-anthracenetriyl) (1,1',8,8',9,9')-diphosphate |
| 3-(isopropoximethyl)-1,8-dihydroxy-9-anthrone | bis-(isopropoximethyl-anthracenetriyl)(1,1',8,8',9,9')-diphosphate |
| 3-(isopropoxiethyl)-1,8-dihydroxy-9-anthrone | bis-(isopropoxiethyl-anthracenetriyl)(1,1',8,8',9,9')-diphosphate |

Each of the aforesaid phosphorylated compounds exists in three other forms with the following postulated structural formula:

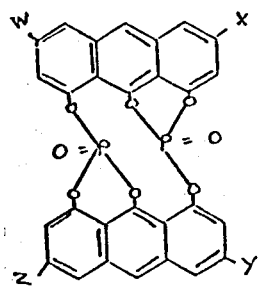

wherein the 3,3' substituted compound X and Z is an alkyloxialkyl group selected from the group consisting of ethioxiethyl, ethoximethyl, propoxipropyl, isopropoxi-isopropyl, propoximethyl, propoxiethyl, isopropoximethyl, and isopropoxiethyl and W and Y are hydrogen atoms, and the 3,6' substituted compound, wherein X and Y is an alkyloxialkyl group and W and Z are hydrogen atoms, and the 6,6' substituted compound wherein W and Y are alkyloxialkyl groups and X and Z are hydrogen atoms.

Each of the aforesaid bis-(alkyloxialkyl-antracenetriyl)-1,1',8,8',9,9')-diphosphate compounds is a yellow to brown crystalline compound without odor and melting above 300°C. The respective new compounds are insoluble in water, slightly soluble in alcohol and propylene glycol but often soluble in acetone and chloroform and have a characteristic infra-red spectra.

EXAMPLE 8

In place of the pyridine used in Examples 1 through 7 there may be substituted in equal volumes, other liquid tertiary amine such as quinolines, picolines, N-methyl-piperidine, N-methyl-morpholine, trimethylamine, triethylamine, tripropylamine and tri-isopropylamine. The remainder of the steps are the same and the respective compound obtained is the same in every respect as the resulting from Examples 1 through 7 above.

EXAMPLE 9

When an ointment containing the new compound is desired, then a therapeutically sufficient quantity of the selected new compound obtained as a result of Examples 1 to 8 above, is mixed with an appropriate quantity of an acceptable ointment vehicle. An optimal concentration of active ingredient used to prepare such an ointment is from 0.1 percent to 20 percent by weight with a preferred range of concentration of active ingredient being from 2 percent to 10 percent by weight. Suitable ointments may be prepared with either an oleagenous carrier as for example, petrolatum, a hydrophilic or lipophilic emulsion ointment base and a water-soluble ointment base. Typical ointment compositions of the type set forth above may be prepared as follows:

a. Oleagenous ointment

| Dianthracenetriyl (1,1',8,8',9,9')-diphosphate | 10 gms. |
| Petrolatum U.S.P. q.s. | 100 gms. |

Melt approximately 80 grams of the petrolatum using care not to overheat. The dianthracenetriyl-(1,1',8,8',9,9')-diphosphate is then added and the whole stirred until a uniform dispersion is achieved. The mixture is then brought to desired weight with additional petrolatum and allowed to cool to room temperature while stirring. The ointment is then packaged in unit containers and is ready for dispersing.

b. Water-in-Oil Emulsion Base

| | |
|---|---|
| Dimethyl-diantracenetriyl-(1,1',8,8',9,9')-diphosphate | 15 gms. |
| Cholesterol | 3 gms. |
| Stearyl alcohol | 3 gms. |
| White Wax | 8 gms. |
| Petrolatum q.s. | 100 gms. |

Melt the stearyl alcohol, white wax and about 60 gms. of the white petrolatum on a steam bath. Add the cholesterol and stir until all have dissolved. In a spearate container, melt about 3 gms. of petrolatum and then add the dimethyl-dianthracenetriyl-(1,1',8,8',9,9')-diphosphate and stir until a smooth paste results. Add this mixture to the stearyl alcohol, white wax and petrolatum, mixing well. Bring to proper weight with additional white petrolatum and stir until congealed.

The resultant ointment base may be used in the anhydrous oleagenous form or mixed with water to form a water-in-oil emulsion base. If it is desired to prepare the water-in-oil phase, then the appropriate amount of water is added before the mixture congeals and the hydrated ointment homogenized. The amount of water to be included in such preparations will vary with the desired degree of hardness. A preferred range of hydration for such water-in-oil emulsion base is from 10 percent to 30 percent by by weight of water.

c. Oil-in-Water Emulsion Base

| | |
|---|---|
| Di(methyloximethyl)-dianthracenetriyl (1,1',8,8',9,9')-diphosphate | 2 gms. |
| Cetyl alcohol | 15 gms. |
| White wax | 1.5 gms. |
| Propylene glycol | 10 gms. |
| Sodium lauryl sulfate | 2 gms. |
| Water q.s. | 100 gms. |

Melt the cetyl alcohol and white wax with one-half the weight of propylene glycol, avoiding heating above 60°C. The remainder of the propylene glycol is mixed with the di(methoximethyl)-dianthracenetriyl-(1,1',8,8',9,9')-diphosphate and stirred until a smooth paste is obtained and this then added to the molten cetyl alcohol-white wax mixture with stirring. The sodium lauryl sulfate is dissolved in about 40 gms. of water with the aid of heat. The oil phase is slowly added to the water phase with rapid stirring. After about five minutes of rapid stirring, the mixture is brought to appropriate weight and with additional warm water and the whole stirred until congealed. The oil-in-water emulsion base thus formed is then milled or homogenized and packaged into suitable unit containers.

A vanishing cream may also be used as a carrier for the active compound, in which a therapeutically sufficient quantity of the desired phosphorylated anthracenetriol compound, described above, is mixed with sufficient cold cream to form a pharmaceutically acceptable ointment preparation.

d. Water-soluble Ointment Base

| | |
|---|---|
| Di(chloromethyl)-dianthracenetriyl-(1,1',8,8',9,9')-diphosphate | 5 gms. |
| Polyethylene glycol-400 | 40 gms. |
| Polyethylene glycol-4000 q.s. | 100 gms. |

Warm equal weights of the glycol components to form a uniform mixture. Add the selected phosphorylated anthracenetriol compound and stir until congealed.

The degree of hardness of the ointment may be varied by replacing a portion of the polyethylene glycol-400 with polyethylene glycol-4000. Between 5 percent and 25 percent of water may be incorporated into the base in which event, approximately 10 percent of the weight of polyethylene glycol-4000 utilized is replaced with an equal weight of stearyl alcohol.

It may be found desirable to use other polyethylene glycol compounds in preparing the ointment base as for example, polyethylene glycol with a molecular weight between 200 and 800 to replace a portion or the entire quantity of polyethylene glycol-400 and a polyethylene glycol compound having a molecular weight of between 1,000 and 6,000 in place of a portion or the entire portion of the polyethylene glycol-4000.

In place of any of the above described phosphorylated anthracenetriol compounds there may be substituted any other of the phosphorylated anthracenetriol compounds described in Examples 1 to 7 above, the concentration of said active ingredient to be between 0.1 percent and 20 percent by weight depending upon the patient's need.

EXAMPLE 10

When it is desired to utilize a lotion as the theraputetic dosage form then this may be prepared by suspending the appropriate quantity of the selected active ingredient in a pharmaceutically acceptable lotion vehicle. The range in concentration of the active ingredient is from 0.1 percent to 20 percent by weight with a preferred dosage range being from 3 percent to 10 percent by weight.

A lotion containing dianthratriol-(1,1',8,8',9,9')-diphosphate is prepared by levigating 2.5 gm. of dianthratriol-(1,1',8.8',9,9')-diphosphate with 20 ml. of ethyl alcohol and 20 gm. of glycerin. In another vessel a solution of 0.1 percent (by weight) of methyl cellulose in water is prepared and an appropriate quantity of the methyl cellulose solution is added to the alcohol-glycerin triturate of the active ingredient so that the total final weight is 100 gm. The whole is then homogenized to form a lotion suitable for therapeutic use.

As an alternate vehicle, an equivalent volume of a bland, vegetable oil as for example, sesame-seed oil, peanut oil or cotton-seed oil, may be substituted for the alcohol described above. In this instance, from 0.1 to 3.0 percent by weight of a surface-active agent, as for example, sodium lauryl sulfate is added to the methyl cellulose solution prior to its addition to the oil-glycerin triturate. After homogenizing, a pharmaceutically acceptable emulsion lotion results. The viscosity of this lotion may be adjusted by the addition of ether oil or water, depending on the nature of the external emulsion phase.

EXAMPLE 11

It may be desired to utilize the new phosphorylated anthracenetriol compounds described in Examples 1 through 7 above in the form of a shampoo or a solid detergent cleansing bar. In these instances, the conventional alkaline preparations should be avoided since an alkaline reacting preparation would tend to decompose the active substance to form a red lake. In preparing these cleansing compositions a non-ionic detergent compound is preferred although in certain instances sodium lauryl sulfate may be used provided the pH of the resultant preparation is maintained below pH 6. The range of concentration of the active phosphorylated anthracenetriol compound in the aforesaid liquid or solid cleansing preparation is from 0.1 percent to 20 percent by weight, with a preferred concentration of from 2 to 10 percent by weight.

Detergent shampoos may be prepared as follows: 8n The sodium lauryl sulfate is dissolved in about 60 cc. of water. The phosphorylated anthracenetriol compound is mixed with the glycerin to form a smooth paste and this is suspended in the sodium lauryl sulfate solution. Water is then added to proper volume. If it is desired to use a suspending agent, then 2 percent of carboxymethyl cellulose may be added, making appropriate adjustment in the water added to bring to final volume.

| (b) Oil Base Shampoos | |
|---|---|
| Di(chloromethyl)-dianthracenetriyl (1,1,8,8',9,9')-diphosphate | 20 gms. |
| Tween 80 | 20 gms. |
| Tween 20 | 4 gms. |
| Cotton-seed oil q.s. | 100 gms. |

The Tween compounds are dissolved in about 40 grams of the oil and to this is added the phosphorylated anthracenetriol compound. The mixture is brought to final volume with additional cotton-seed oil.

Should it be desired to use an emulsion shampoo then from 5 to 25 parts by weight of water may be mixed with the oil base shampoo and the whole homogenized. In place of the cotton-seed oil used above there may be substituted peanut oil, sesame oil, olive oil, or a bland vegetable oil. In place of the Tween compounds described above there may be substituted any other non-ionic detergent, as for example, Pluronic or sodium lauryl sulfate.

Solid detergent bars containing the new phosphorylated anthracenetriol compound may be prepared by incorporating a compound obtained as a result of Examples 1 to 8 above, with a carrier comprising:

| Non-ionic detergent | 35 parts |
|---|---|
| Talc | 10 parts |
| Diluent | 55 parts |

The solid ingredients are mixed, milled and extruded into a bar. The bar is then shredded and mixed with a therapeutically sufficient quantity of the selected phosphorylated anthracenetriol compound and then shaped into a cake of suitable size.

The proportion of ingredients described above may be varied to meet special needs. Thus the range in concentration of detergent may be between 15 percent and 35 percent, whereas the hardening agent, such as talc, may be between 5 percent and 15 percent, with the remainder being diluent. Appropriate diluents are polyoxyethylene glycols having a molecular weight of 1,000 to 6,000, cetyl alcohol, stearyl alcohol, hydrogenated coconut oil, stearic acid, and mixtures of these. Suitable detergents are any anionic detergent as for example, the polyoxyethylene sorbitan oleates, stearates and laurates, the pluronic series of compounds or the neutronyx series of detergents or mixtures of these. Sodium lauryl sulfate and Igepon may be utilized. It may be preferred to utilize a neutral soap as a carrier for the active compounds in which case such soaps must have a pH not above pH 6 to be advantageously used. Such soap compositions are first reduced to a powder, mixed with the active ingredient and then shaped into bars of suitable size.

The liquid and solid detergent compositions are applied directly to the affected area which has been previously moistened with water. A rich lather is developed and allowed to remain for a period of two to five minutes and then rinsed with water. The treatment may be repeated if necessary. While the cleansing of the affected skin may be conducted as often as is required, the shampoo treatment of the hair and the scalp is carried out from one to four times weekly although in certain conditions, it may be required once daily.

EXAMPLE 12

In certain circumstances it may be found desirable to utilize the active ingredient directly on the lesion. In these circumstances the pure chemical substance, obtained as a result of Examples 1 through 8 above, is micronized and the resultant micronized powder is placed in contact with the affected area at least once daily. Such treatment is an extreme form of therapy desired to produce an acute cellular tissue response and is not a customary procedure but may be desirably utilized in therapy.

EXAMPLE 13

When it is desired to utilize the compositions described in Examples 9 through 12 in therapy, then the appropriate selected agent is applied to the affected area from one to six times daily, depending on the nature and type of lesion being treated, as well as the severity of the disease and the condition of the patient.

When psoriasis is being treated with a composition containing the new compounds as described above, then preferred unit dosage forms are ointments or lotions, although special patient needs may direct a preference for the other dosage forms as well as a combination of these. When the psoriatic lesion is dry and crusted, then the ointment or the lotion is preferred and often a combination of both will be used. For a weeping-open lesion, a hydrophilic preparation such as the lotion or hydrophilic ointment is preferred. Thus, it is seen that all of the dosage forms have a special use in the treatment of psoriasis.

When it is desired to treat a psoriatic lesion the selected dosage form is applied to the affected area from one to six times daily. The site may be bandaged (or not) depending on the patient's and clinician's preference. A resolution of the psoriatic disease will be observed after a relatively short period of therapy as for example, from one to three weeks, and the disease will be brought under continued control by the application of maintenance therapy with compositions containing the selected active ingredients described above.

Similar therapeutic beneficial effects will be observed after the application of the appropriate above-described compositions to an eczematoid lesion and seborrhea. When an eczematoid lesion and seborrhea are treated with compositions containing the new compounds described in Examples 1 through 8 then the preparation is applied from one to six times daily. After three to four days of therapy, a beneficial response is observed which is continued with maintenance therapy. Maintenance therapy regimens may provide for a minimal frequency of application to the affected area of from once weekly to a frequency of several times daily. The frequence of application of the compositions will depend entirely on the patient's medical history, severity of disease and the response to therapy.

EXAMPLE 14

In the treatment of eczema, psoriasis, seborrhea and scleraderma, it will be found desirable to incorporate from 0.1 percent to 5 percent of an anti-inflammatory compound as for example, cortisone, hydrocortisone, hydrocortisone acetate, prednisolone or other steroid compounds having tissue anti-inflammatory properties into compositions containing the phosphorylated anthracenetriol compound. Thus, any one of the aforesaid steroid agents may be mixed in a therapeutically sufficient quantity into an ointment, lotion, shampoo or detergent cake containing the new phosphorylated anthracenetriol compound. The method of use and the frequency of application remain the same but a synergistic action occurs in that a lesion previously refractory to other forms of therapy will now be found to respond and to be brought into therapeutic control.

What is claimed is:

1. A pharmaceutical composition comprising a therapeutically sufficient quantity to achieve an anti-psoriatic action of a compound selected from the group consisting of compounds of the structure

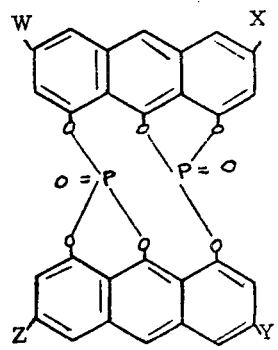

wherein W, X, Y and Z are selected from the group consisting of hydrogen, lower alkyl, halo-alkyl, acetoxy-alkyl, carboxyl, carboalkyloxy-alkyloxyalkyl, halogen and nitro groups wherein said alkyl group is from 1 to 3 carbon atoms in chain length, and a pharmaceutically acceptable carrier therefor.

2. A pharmaceutical composition comprising from 0.1 percent to 20 percent by weight of a compound selected from the group consisting of compounds of the structure

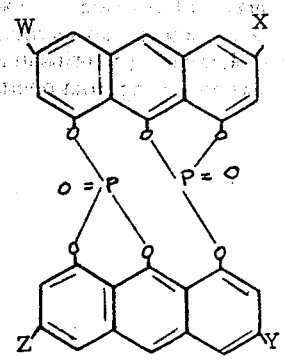

wherein W, X, Y and Z are selected from the group consisting of hydrogen, lower alkyl, halo-alkyl, acetoxy-alkyl, carboxyl, carboalkyloxy-alkyloxyalkyl, halogen and nitro groups wherein said alkyl group is from 1 to 3 carbon atoms in chain length, and a pharmacuetically acceptable carrier therefor.

3. A pharmaceutical composition of claim 2, said pharmaceutically acceptable carrier being an ointment base.

4. A pharmaceutical composition of claim 2, said pharmaceutically acceptable carrier being a lotion vehicle.

5. A pharmaceutical composition of claim 2, said pharmaceutically acceptable carrier being a halocarbon selected from the group consisting of trichlorofluoromethane, dichlorodifluoromethane and dichlorotetrafluoromethane.

6. The method of achieving an anti-psoriatic effect which comprises applying a preparation selected from the group consisting of compounds of the structure

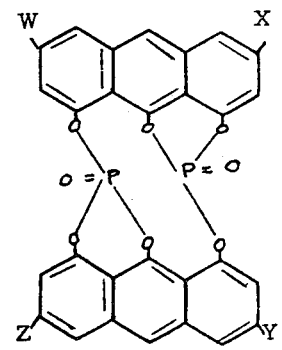

wherein W, X, Y and Z are selected from the group consisting of hydrogen, lower alkyl, halo-alkyl, acetoxy-alkyl, carboxyl, carboalkyloxy-alkyloxalkyl, halogen and nitro groups wherein said alkyl group is from 1 to 3 carbon atoms in chain length, to the psoriatic lesion of a human or an animal from one to six times daily.

7. The method of claim 6 said being dianthracenetriyl-(1,1',8,8',9,9')-diphosphate.

8. A method for achieving an anti-psoriatic action in a human or animal presenting the symptoms of psoriasis comprising applying one to six times daily to said human or animal a therapeutically sufficient quantity to achieve said anti-psoriatic action of a composition of claim 2, further containing from 0.1 percent to 5.0 percent of an anti-inflammatory compound selected from the group consisting of cortisone, hydrocortisone, hydrocortisone acetate and prednisolone.

9. The method of treating arthritis in a human or animal comprises administering from one to six time daily to said human or animal, a therapeutic sufficient quantity to treat arthritis of the composition of claim 2 further containing from 0.1 percent to 5.0 percent of an anti-inflammatory compound selected from the group consisting of cortisone, hydrocortisone, hydrocortisone acetate and prednisolone.

* * * * *